Jan. 31, 1967   H. E. BECKER   3,301,404
STRAINER
Filed May 15, 1964   2 Sheets-Sheet 1
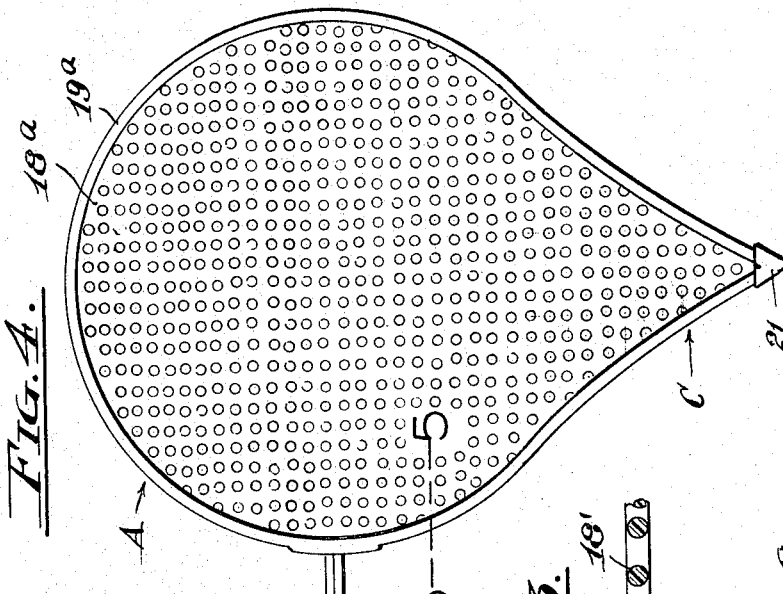
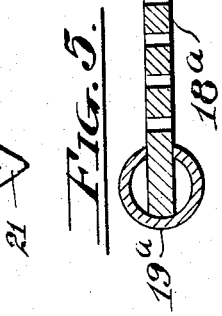
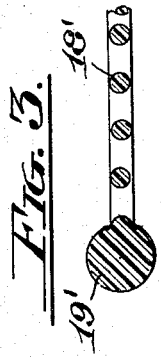
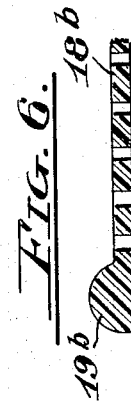
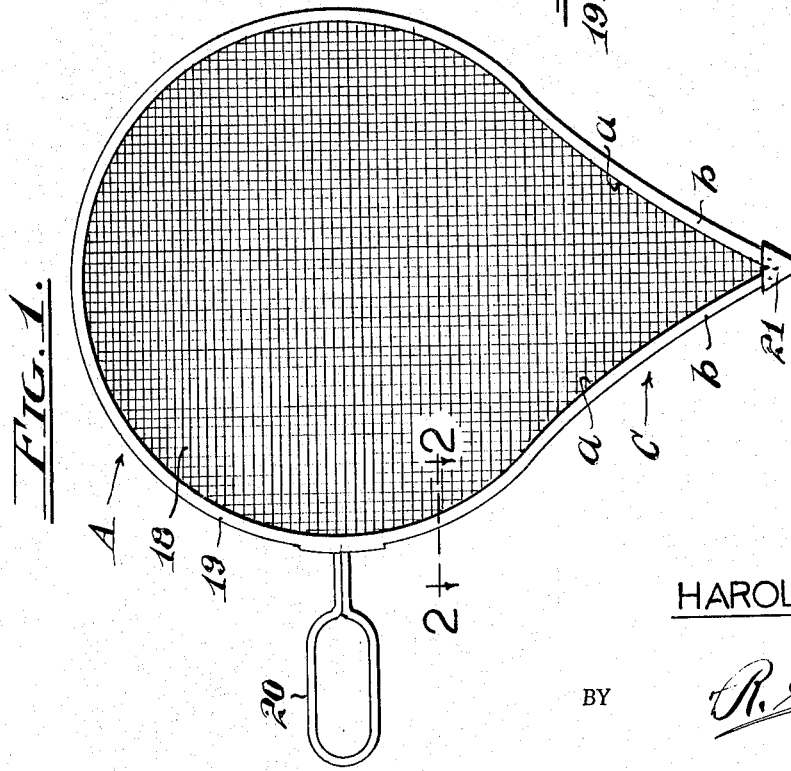
INVENTOR
HAROLD E. BECKER
BY
ATTORNEY Jan. 31, 1967  H. E. BECKER  3,301,404
STRAINER
Filed May 15, 1964  2 Sheets-Sheet 2
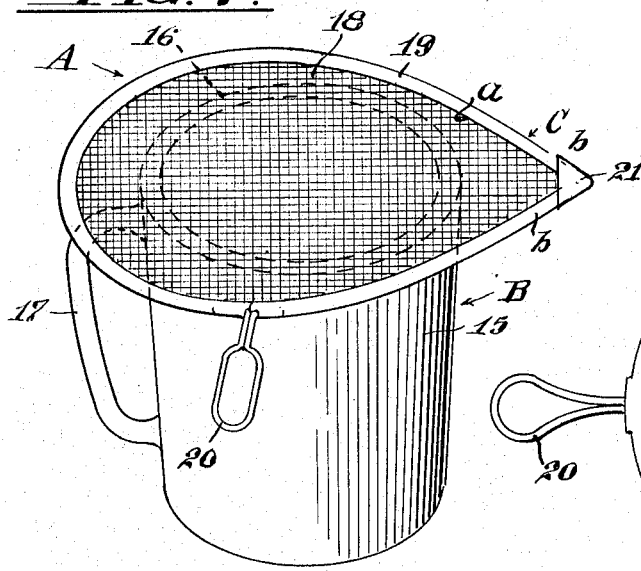
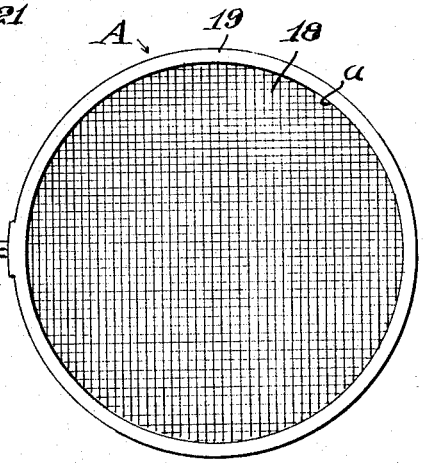
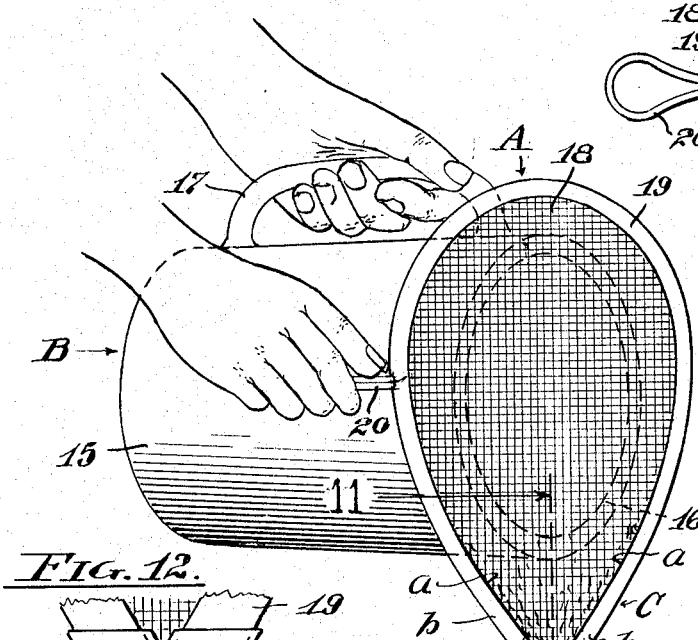
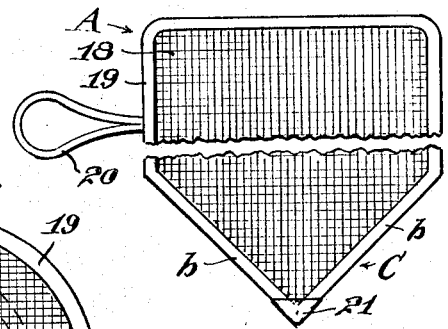
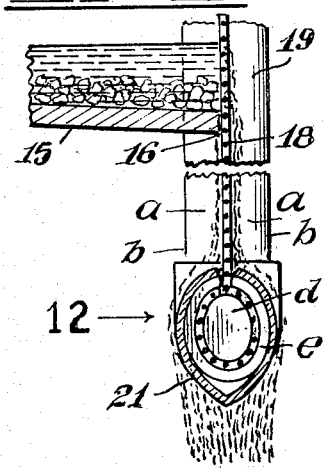
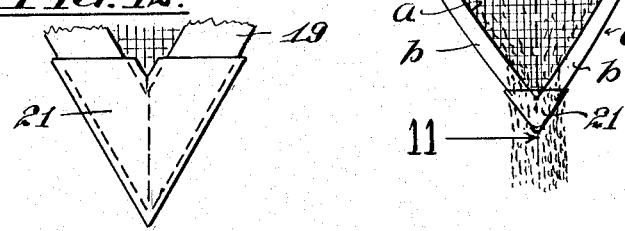

United States Patent Office 3,301,404
Patented Jan. 31, 1967

3,301,404
STRAINER
Harold E. Becker, Los Angeles, Calif., assignor of one-half to Richard S. Backlund, Los Angeles, Calif.
Filed May 15, 1964, Ser. No. 367,655
2 Claims. (Cl. 210—465)

This invention relates to a strainer and has as its primary object the provision of a hand operated strainer which is especially applicable for use in conjunction with open flat topped vessels in such manner as to drain liquid from a vessel and separate it from solid particles contained in the vessel without discharging the particles therefrom.

The strainer is particularly advantageous for use in laboratories and kitchens where it is desirable to separate liquids from divided solids without materially disturbing the solids or emptying them from the container in which the liquid and solid mixture is confined.

Heretofore it has been common practice to pour mixtures of liquids and solids into bowl shaped or conical strainers or collanders from which the liquids drain to discharge leaving the solids in the strainer and necessitating emptying the solids from the strainer to condition it for reuse.

In many instances this practice involves cleaning the strainer before reuse thereof, since in pouring the mixture into the strainer the solids in impacting on the screening surface may tend to clog the pores thereof. This practice sometimes involves the use of an implement such as a spoon or paddle to stir the mixture to loosen the body of solids and prevent impacting thereof and thereby hasten the discharge of the liquid. This stirring of the solids sometimes presses portions thereof into and through the pores of the screen resulting in clogging the pores and delivering unwanted portions of the solids into the drained liquid. The use of such conventional strainers delivers liquid over an expansive area and necessitates the employment of a funnel where it is desired to direct the liquid emitted from the strainer into a restricted area.

Other objects of the invention are to provide a strainer which will obviate the above recited objectionable features of conventional strainers by eliminating excessive impact of the solids on the strainer screen and thereby minimizing clogging thereof, obviating need of stirring the mixture by delivering the liquid to the strainer screen in most part from above the body or mass of divided solids, and enabling delivery of the drained liquid from the strainer in a concentrated stream so that it may be directed into a restricted area without the use of a funnel or the like and without the employment of a projecting nose or spout on the vessel being drained.

A further object is to provide a hand strainer of the type in which a flat strainer is imposed horizontally over the open top of a vessel to be drained and the assemblage tilted to effect discharge of liquid outwardly through the then vertical or near vertical strainer, in which the liquid emitted through the strainer will flow downward over the outer face thereof and be directed to discharge onto and over a convergent tongue on the strainer substantially spaced relative to the contiguous portion of the margin of the vessel, whereby the discharging liquid will comprise a narrow concentrated stream which can be delivered into a small aperture without the aid of a funnel.

The invention resides in the parts and in the construction, arrangement and combination of parts, hereinafter described and claimed, and illustrated in the accompanying drawings, in which:

FIG. 1 is a view in elevation depicting one form of the invention;

FIG. 2 is an enlarged detail in section as seen on the line 2—2 of FIG. 1;

FIG. 3 is a sectional view similar to FIG. 2 showing a modified construction of the strainer screen and its encompassing frame;

FIG. 4 is a view in elevation depicting another form of the invention;

FIG. 5 is an enlarged detail in section taken on the line 5—5 of FIG. 4;

FIG. 6 is a view in section similar to FIG. 5 showing a modified form of the strainer screen and frame of the structure shown in FIG. 4;

FIG. 7 is a perspective view illustrating the mode of initially applying the strainer to a vessel containing a mixture of solids and liquid to be separated;

FIG. 8 is a perspective view of the combined strainer and vessel shown in FIG. 7 as manually positioned to effect drainage of liquid from the vessel;

FIGS. 9 and 10 are views in elevation depicting modified forms of the strainer;

FIG. 11 is an enlarged section as seen on the line 11—11 of FIG. 8, illustrating the mode of operation of the strainer and depicting the manner in which a concentrated stream of liquid is delivered by the screen from a spoutless vessel; and FIG. 12 is a detail in elevation as seen in the direction of the arrow in FIG. 11 showing the construction in the screen whereby a concentrated stream is delivered therefrom apart from the vessel being drained.

Referring to the drawings more specifically A indicates generally a hand strainer and B designates a vessel having a flat open top and embodying a continuous side wall 15 having a co-planar marginal rim 16 which, as shown, may be spoutless. The vessel B may comprise any of various open topped portable containers such as cups, bowls, basins, tumblers, pots, pans and the like, capable of being manually lifted, tilted and held in one hand to effect pouring of the content thereof therefrom. As here shown the vessel embodies a conventional cup having a handle 17.

The strainer A embodies a flat fine apertured screen 18 having its margin bordered throughout by a frame 19 having a handle 20 projecting laterally therefrom and extending on a plane of the screen 18 which handle is grasped in the hand of a person in manually positioning the strainer over the open end of the vessel B and in holding it seated against the rim 16 while the vessel B is being tilted to drain its content. The screen is dimensioned to overlie the open end of the vessel with its margin projecting outwardly therefrom in detached space relation thereto and accordingly exceeds the size of the open end of the container B; the screen being designed to be positioned on the vessel with a wide expanse thereof projecting outwardly from the vessel rim.

The frame 19 has an inner margin which projects outwardly from opposite sides of the screen 18 forming ridges a—a along and throughout the margins of the screen whereby liquid flowing over the outer face of the screen when the latter is disposed in its upright or near upright straining position as shown in FIG. 11 and as later described, will be directed to discharge at the lowermost marginal portion of the screen.

The ridges a—a in projecting from opposite sides of the screen permits application of the screen with either side thereof presented to the rim of the vessel A, thus rendering the strainer reversible.

As a means for concentrating the stream of liquid flowing from the margin of the strainer a pouring tongue C is provided on the marginal portion of the screen 18 presented downward when the strainer is applied, which tongue is here shown as formed in continuation of the screen and as extending on a plane therewith. The side margins of the tongue C are bordered by continuations b—b of the frame 19 which side margins and frame portions b—b converge to a tip from which liquid flowing over the tongue C will flow in a narrow stream; the frame portions b—b serving to confine the flow of liquid longitudinally of the tongue C and to concentrate the flow laterally as it approaches discharge at the tip 21 of the tongue, which tip comprises a cap crimped on and uniting the ends of the frame 19, as shown in FIG. 12, over which the discharging stream flows.

The strainer A may be of various configurations in outline and while the tear-drop contour shown in FIGS. 1, 4, 7 and 8 is preferred, the invention is not limited thereto. For example the strainer may be circular in outline and the tongue C omitted as shown in FIG. 9 or may be of general rectilineal outline as shown in FIG. 10 with one side portion thereof converging to a tip.

The screen 18 may consist of a sheet of fine mesh woven wire as indicated in FIGS. 1–2 with the frame 19 comprising a reinforcing wire core d around which the margin of the screen is bent and this assemblage encompassed in a sheath e as is common in strainer construction. However, the strainer may be formed of plastic material molded in one piece as indicated in FIG. 3 wherein the screen 18′ and frame 19′ are unitary.

Another form of the strainer is shown in FIGS. 4 and 5 wherein the screen 18a comprises a perforated sheet encompassed by a marginal frame 19a as shown in FIG. 5. This structure may also be molded of plastic as shown in FIG. 6, wherein the screen 18b and frame 19b are formed unitarily. In any event the strainer is characterized by being capable of being positioned flatwise over the open end of a vessel B in seated relation to the rim thereof. The apertures of the screen may be of any desired dimensions, being of such size as to preclude the passage therethrough of solids to be separated from the liquid being drained.

In the operation of the invention, the strainer A is initially imposed on the rim 16 of a vessel B containing a mixture of divided solids and liquid with a wide marginal expanse of the screen projecting outward from the vessel's rim, as illustrated in FIG. 7, whereupon the vessel and strainer are grasped in the hands of an operator (one in each hand) and tilted as shown in FIG. 8. In this operation the strainer A is held with the screen 18 pressed tightly against the rim 16 in a vertical or near vertical position and with the tongue C, or a marginal portion of the screen presented downward in spaced relation to the contiguous lower portion of the rim 16 of the vessel B as particularly shown in FIG. 11 so as to present a wide expanse of screen surface extending beyond the rim 16 over which liquid that has been discharged through the screen will flow until arrested by the bordering frame a—a.

On the vessel B being inclined sufficiently to bring its liquid content against the screen, a portion of the liquid will ooze through the unrestricted apertures of the screen and will flow downwardly over the outer face of the screen until intercepted by the inner margin a of the frame 19 whereupon this downwardly moving screened liquid will be diverted laterally either onto the upper end of the tongue C to discharge over the tip 21 or over the lowermost portion of the strainer, the liquid clinging to the surface of the screen until it reaches the point of discharge. This flow of the liquid over the outer face of the screen is influenced by capillary action and by surface tension of the liquid which with the confining action of the inner margin a of the frame 19 causes the liquid to pass from the strainer at its margin in a compact or concentrated stream as indicated in FIG. 11.

However, in some instances a portion of the liquid flowing over the outer face of the screen below the margin of the container B may pass through the screen and flow downward over the back thereof, but in any event the inner margins a—a of the frame will direct the discharging liquid in most part toward the tip 21.

By provision of the tapered tongue C with the bordering convergent frame members b—b the fluid will flow over the tip 21 in a concentrated stream thereby enabling ready directing of the discharge liquid into a small apertured container without the use of a funnel or the employment of a spout on the vessel being drained.

On draining the liquid from the divided solids in the vessel B the latter is restored to its upright position and the strainer removed, the solids being thus retained in the vessel.

Manifestly in operating the strainer as above set forth, tilting of the vessel B may be effected gently so as to avoid violent impacting of the solids content against the screen thereby minimizing clogging of the screen and thus facilitating drainage of the liquid.

By arranging the screen and its encompassing frame with the inner margin a—a of the frame projecting from opposite sides of the screen, the strainer is rendered reversible so that it can be used either by right or left handed persons.

In effecting the recited straining operation the solids in the container B are arrested by the screen at the lower portion of the tilted container, whereby the major portion of the liquid being drained will pass freely through unobstructed portions of the screen extending above the arrested solids. Since the flow of the liquid through the screen is by gravity with but a minimum of pressure behind the flow, the liquid does not pour through the screen and be projected outwardly therefrom, but as before described, will not leave the screen and will follow the screen surface until it reaches the lowest edge.

In event the lower portion of the screen should become clogged by solids being drained, such as to prevent the passage of the liquid therethrough, such will have the effect of raising the level of the liquid in the vessel when it is tilted forward to deliver liquid through the screen above the clogged portion, such will not interfere with the delivery of liquid from the screen in a compact column, since whatever liquid passes through the screen throughout the entire expanse thereof, while the screen is in operation will be directed by the side members a—a of the frame 19 onto the confining and concentrating tongue C and thereby delivered to discharge in a column.

The strainer herein set forth constitutes an improvement over the conventional bowl type strainer not only as hereinbefore indicated but also has further advantages thereover including compactness, speed with which straining operation can be made, ease of cleaning after using due to its flat surface, and because of not receiving the solids being drained, can not be overfilled. Furthermore no means of attachment between the screen and vessel is required, nor is any particular relation needed between the vessel and screen other than the abutment between the rim of the vessel and the adjacent face of the screen and the spacing of the drainage tongue C or rim of the screen relative to the rim of the vessel as set forth.

I claim:

1. The combination with an open topped vessel embodying a continuous side wall having a co-planar marginal rim, of a hand strainer comprising a flat screen for removable positioning on said rim, said screen being dimensioned to overlie the open top of said vessel and to protrude outwardly therefrom with a broad expanse of screen extending between the rim of the vessel and the margin of said screen, a frame encompassing the margin of said screen and attached thereto, and a handle affixed to and projecting laterally from said frame for grasping in the hand of a person and whereby the screen may be imposed on the vessel rim in overlying relation to the open top of the vessel, a convergent pouring tongue extending from said projecting broad expanse of screen in continuation thereof whereby said tongue is in spaced relation to the rim of said vessel and the side margins of said tongue being bordered by said frame with said frame terminating in a tip and having inner margins projecting outwardly in opposite directions away from the plane of the screen forming liquid directing ledges leading to said tip for contracting liquid flowing from said screen over said tongue into a narrow stream.

2. A hand-strainer comprising a flat screen, a frame bordering the margin of said screen and affixed thereto, a convergent pouring tongue projecting from a marginal portion of said screen co-planar therewith, said frame having portions bordering the margins of said tongue and converging to a tip and having inner margins projecting outwardly in opposite directions away from the plane of the screen forming liquid directing ledges leading to said tip, and a handle attached to said frame whereby the strainer may be manually held with said screen disposed in an upright or near upright position with said tip extended downward while directing a flow of liquid therethrough and causing the liquid to gravitate downward over the outer face of the screen to discharge at the lower portion of the margin of the screen over said pouring tongue in a narrow stream.

References Cited by the Examiner

UNITED STATES PATENTS

| | | | |
|---|---|---|---|
| 688,397 | 12/1901 | Des Isles | 210—469 |
| 1,662,343 | 3/1928 | Sharpneck et al. | 210—465 |
| 1,750,158 | 3/1930 | Blakeman | 210—465 |
| 2,021,874 | 11/1935 | Taylor | 210—464 X |
| 2,398,978 | 4/1946 | Udell | 210—469 |
| 2,532,052 | 11/1950 | Berman | 210—471 |
| 3,269,545 | 8/1966 | Udell | 210—469 |

FOREIGN PATENTS 599,217    3/1948    Great Britain.

REUBEN FRIEDMAN, *Primary Examiner.*

C. DITLOW, *Assistant Examiner.*